Patented Feb. 24, 1953

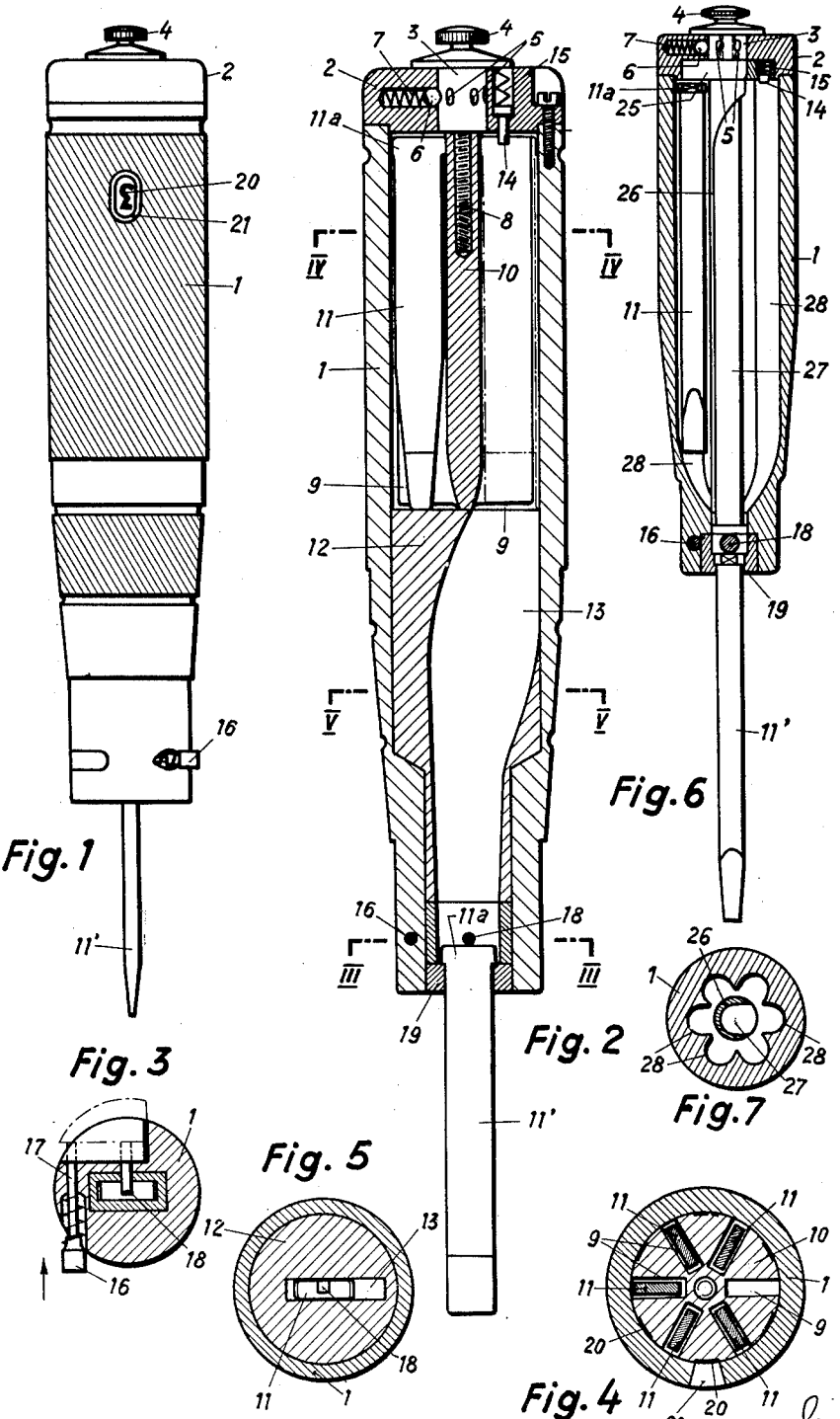

2,629,413

UNITED STATES PATENT OFFICE 2,629,413

REGISTERING CHAMBER MAGAZINE HANDLE

Rudolf Stettler, St. Gallen, Switzerland

Application November 1, 1947, Serial No. 783,479
In Switzerland October 17, 1946

Section 1, Public Law 690, August 8, 1946
Patent expires October 17, 1966

2 Claims. (Cl. 145—63)

The invention relates to a hand tool having in a handle a plurality of tools which can be brought singly into the working position and firmly held there. The novelty consists in the tools being arranged separately in cells lying round the axis of the handle and that a guiding duct is provided for the tools to lead them into the working position, the whole being such that the cells on the one hand and the guiding duct on the other hand are rotatably arranged with respect to each other in order to lead the tools separately into and out of the working position.

Two preferred forms of arrangement of the object of the invention are illustrated in the accompanying drawing, in which:

Fig. 1 is a view and

Fig. 2 an axial section on a larger scale.

Figs. 3–5 are sections on the lines III—III, IV—IV and V—V of Fig. 2, and

Figs. 6 and 7 axial and cross sections respectively of a second form of arrangement.

The tool illustrated in Figs. 1–5 has a handle 1, which is at least partly fluted or roughened on its outer surface. The handle 1 is closed at one end with a cover 2 in which a bolt 3 is rotatably supported and carries a rotatable button 4. The bolt 3 has for instance six recesses 5 into which a ball 6 is intended to enter under the action of a spring 7. By means of a screw thread 8, a holder 10, which is provided with cells 9, is connected rigidly to the bolt 3 and the button 4. Each cell serves for taking tool 11. In the position shown in the drawing, each of the tools stands on an insert piece 12 arranged in the handle 1, with the sole exception of one tool which falls down through a guide duct 13 into the position of tool 11'. As soon as the tool falls down a pin 14 enters the empty cell 9 under the action of a comparatively weak spring and also under its own weight and thus prevents the holder 10 from turning. In order that the tool required for working may fall into its lowest position of tool 11', the knob 16 is pushed inwards against the action of a spring 17 (direction of the arrow in Fig. 3), so that the pin 18 connected with it leaves the duct 13. When the tool has arrived into its working position the knob 16 is let loose and the pin 18 consequently enters at once again into the duct 13 under the action of the spring 17. Each tool has somewhat widened head 11a, which is intended to lie on a disc 19, rigidly supported in the handle 1 (Fig. 2). The pin 18 lies close over the head 11a, so that the tool 11' is held well and securely in its working position.

If it is desired to bring another tool into the working position, the handle 1 is turned upside down through 180°; the button 4 is therefore below. If the knob 16 is pushed inwards the tool 11a falls back into the empty cell 9. The strength of the spring 15 is such that the spring is compressed by the weight of the tool when its head 11a engages the pin 14. When in inverted position, the heads 11a of the tools align with the top of the holder 10 and entirely disengage the pin from the cells, so that the holder 10 can now be turned with the button 4 until the cell with the required tool comes under the duct 13. If the handle 1 is now again turned back through 180°, the desired tool falls down through the guide duct 13, in the manner already described. On the holder 10 marks 20, for instance numerals, are provided which are visible through a window 21 in the handle 1. These marks make it possible to set the required tool into its working position. These marks could also be provided on the button 4 or on the cover 2, instead of on the holder.

The tool according to Figs. 6, 7, in which the same parts are given the same reference numerals as those in Figs. 1–5, differs from the construction illustrated in the first example, in that the holder 10 provided with cells 9 is no longer movable with respect to the guide duct, but on the contrary the guide duct is movable with respect to the cells. A disc 25 and a holder 26 are rigidly connected to the bolt 5, the holder 26 having a guide duct 27. The cells 28 each containing a tool 11, are arranged in the wall of the handle 1. By turning the button 4, the duct 27 can be brought beside the desired tool and the tool is led by this duct into its working position. The securing of the part which can be rotated with the button 4, is again effected by pin 14 and spring 15, and the securing of the tool in the working position is effected by pin 18 as previously described. Ball 6 and spring 7 again allow the registering of the duct 27 with a cell 21 to be recognised. Also this arrangement may be provided with a window 21.

The new hand tool is preferably made of metal; at least a part of it could also be made of one of the known opaque or transparent plastics (the latter being for instance that known as Plexiglas). The tools shown in the drawing are sets for use as screw-drivers. Further examples of tools are those for saddlers and shoemakers (awls, etc.), further manicure appliances, letter openers, erasing or other knives, needle-files for tool and instrument makers, etc. At least a part of the cells may also be adopted as needle holders for sewing machine needles.

What I claim is:

1. A magazine type hand tool, comprising, a hollow handle, a compartmented tool holder, said tool holder being rotatably mounted in said handle at one end thereof, an insert in said handle for retaining tools in said holder, a disc having a rectangular aperture, secured within the other end of said handle adjacent said insert for positioning a rectangular tool in working position, a duct arranged in axial direction in said insert for guiding a tool from said holder into said apertured disc, a bolt fixedly secured to said tool holder and extending from the end of said handle opposite said disc, said bolt being used for rotating said holder within said handle, spring pressed detent means for positioning said bolt, spring pressed locking means for engaging in said holder to prevent rotation thereof when a tool is absent therefrom, and second spring pressed locking means for locking a tool in its working position in said apertured disc, the selected tool being automatically fed into said apertured disc when the tool is directed downwardly and being automatically returned to said tool holder when the tool is directed upwardly and said second locking means is released, the tool upon its re-entry to said tool holder engaging said first mentioned locking means to disengage same from said holder and release said holder for rotation.

2. A magazine type hand tool, comprising, a hollow handle, a compartmented tool holder, said tool holder being rotatably mounted in said handle at one end thereof, an insert in said handle for retaining tools in said holder, a disc having a rectangular aperture secured at the other end of said handle adjacent said insert for slidably receiving the shank of a tool advanced to working position, a duct arranged in axial direction in said insert for guiding a tool from said holder into said apertured disc, a bolt fixedly secured to said tool holder and extending from the end of the handle opposite said disc, said bolt being used for rotating said holder within said handle, spring pressed detent means cooperating with said bolt for positioning said tool holder with any selected compartment in alinement with said duct, spring pressed locking means actuatable solely by said tools engaging said holder to prevent rotation thereof when a tool is absent therefrom, a second spring pressed locking means for locking a tool slidably moved with its shank through said apertured disc in its working position, said second locking means including a pin positioned in said handle adjacent said disc to engage the top face of the tool, and manually operable means for disengaging said pin from said head, a window in the handle, and indications on said rotatable holder so positioned with respect to said window in said handle as to indicate the tool compartment in alinement with said duct.

RUDOLF STETTLER.

REFERENCES CITED

The following references are of record in the file of this patent:

UNITED STATES PATENTS

| Number | Name | Date |
|---|---|---|
| 438,150 | Glover | Oct. 14, 1890 |
| 532,823 | Sanger | Jan. 22, 1895 |
| 728,188 | Barstad | May 19, 1903 |
| 873,625 | Starrett | Dec. 10, 1907 |
| 1,816,812 | Allison | Aug. 4, 1931 |
| 2,317,106 | Nummelin | Apr. 20, 1943 |

FOREIGN PATENTS

| Number | Country | Date |
|---|---|---|
| 253,542 | Switzerland | Nov. 16, 1948 |
| 387,539 | Great Britain | Feb. 9, 1933 |